(12) United States Patent
Ilic et al.

(10) Patent No.: US 7,999,526 B2
(45) Date of Patent: Aug. 16, 2011

(54) DIGITAL CHARGE-MODE CONTROL OF A POWER SUPPLY

(75) Inventors: Milan Ilic, Fort Collins, CO (US); Vladislav V. Shilo, Fort Collins, CO (US)

(73) Assignee: Advanced Energy Industries, Inc., Fort Collins, CO (US)

( * ) Notice: Subject to any disclaimer, the term of this patent is extended or adjusted under 35 U.S.C. 154(b) by 247 days.

(21) Appl. No.: 12/426,698

(22) Filed: Apr. 20, 2009

(65) Prior Publication Data

US 2010/0141224 A1 Jun. 10, 2010

Related U.S. Application Data

(60) Provisional application No. 61/120,258, filed on Dec. 5, 2008.

(51) Int. Cl.
G05F 1/565 (2006.01)
G05F 1/575 (2006.01)

(52) U.S. Cl. .................. 323/283; 323/285

(58) Field of Classification Search .......... 323/282, 323/283, 285, 222; 363/21.05, 21.13
See application file for complete search history.

(56) References Cited

U.S. PATENT DOCUMENTS

| | | | |
|---|---|---|---|
| 6,177,787 B1 | 1/2001 | Hobrecht | |
| 6,909,268 B2 * | 6/2005 | Taghizadeh-Kaschani | .. 323/284 |
| 6,937,486 B2 * | 8/2005 | Liu et al. | ............. 363/41 |
| 7,276,861 B1 * | 10/2007 | Shteynberg et al. | ........ 315/291 |
| 2004/0156219 A1 | 8/2004 | Chapuis | |
| 2006/0056204 A1 * | 3/2006 | Yang et al. | ............ 363/10 |
| 2006/0091872 A1 * | 5/2006 | Matsuura | ............ 323/283 |
| 2008/0067993 A1 * | 3/2008 | Coleman | ............. 323/282 |
| 2009/0146634 A1 * | 6/2009 | Audy | ................ 323/290 |

OTHER PUBLICATIONS

Notification of Transmittal of International Search Report and the Written Opinion of the International Searching Authority or the Declaration for PCT/US09/66183 mailed Feb. 23, 2010.

* cited by examiner

Primary Examiner — Adolf Berhane
Assistant Examiner — Fred E Finch, III
(74) Attorney, Agent, or Firm — Neugeboren O'Dowd PC; Sean R. O'Dowd (57) ABSTRACT

Disclosed herein are an apparatus and method for charge-mode control. An embodiment of a charge mode controller may include an analog/digital converter configured to monitor the current through a duty cycle switch and convert the current to a switch current value; an accumulator module configured to integrate the switch current value during the switching cycle and output an accumulated charge value; and a comparator module responsive to the accumulated charge value and a charge set point configured to generate a gate drive signal for the duty cycle switch that turns the duty cycle switch ON when the accumulated charge value is less than the charge set point and turns the duty cycle switch OFF when the accumulated charge value reaches the charge set point and thereby controls the duty cycle of the converter and the power supplied by the power stage.

19 Claims, 7 Drawing Sheets

DIGITAL CHARGE-MODE CONTROL OF A POWER SUPPLY

CROSS REFERENCE TO RELATED APPLICATION

This application claims the benefit of the filing date of commonly assigned, provisional application Ser. No. 61/120,258 entitled Charge-mode Control of a Plasma Process filed Dec. 5, 2008.

BACKGROUND OF THE INVENTION

1. Field of the Invention

This invention relates generally to control of a power supply. More particularly the invention relates to control of a switching mode power stage supplying power to either a fixed load or a variable load.

2. Brief Description of Prior Art

Charge-mode controllers for switch mode power supplies are very desirable as they provide a fast response to transients in the load and high immunity to switching noise. Also it can increase the power supply output impedance to prevent oscillation with negative impedance loads.

Analog charge-mode controllers for a switching mode power supply have been designed to deal with the significant problem of instability caused by variations in the load and the duty cycle of the power supply. Depending upon the load impedance and the duty-cycle of the gate drive signal for the switch in the voltage converter of the power supply, an analog charge-mode controller and a voltage converter can go unstable and begin to oscillate. A discussion of this problem with analog charge-mode controllers is reported in an article entitled "Charge Control: Modeling Analysis and Design" by W. Tang, F. C. Lee, R. Ridley, and I. Cohen, at the Proceedings of IEEE Power Electronics Specialists' Conference, 1992, pp. 503-511.

What is needed is a stable charge-mode controller for a switch mode power stage. The controller and power stage should have a wide bandwidth capable of handling any load condition. Such a controller and power stage would enable many new processes and many new systems from hand-held electronic devices to hybrid engine systems.

SUMMARY OF THE INVENTION

One embodiment may be characterized as a digital charge-mode controller for a switched power stage. The controller in this embodiment includes an analog/digital converter configured to convert the current through a duty cycle switch to a switch current value; an accumulator module integrating the switch current value during the switching cycle and outputting an accumulated charge value; and a comparator module responsive to the accumulated charge value and a charge set point to generate the gate drive signal for the duty cycle switch that turns the duty cycle switch ON when the accumulated charge value is less than the charge set point and turns the duty cycle switch OFF when the accumulated charge value reaches the charge set point and thereby controls the duty cycle of the converter and the power supplied by the power stage.

These and various other features as well as advantages, which characterize the present invention, will be apparent from a reading of the following detailed description and a review of the associated drawings.

DETAILED DESCRIPTION

Figure 1:
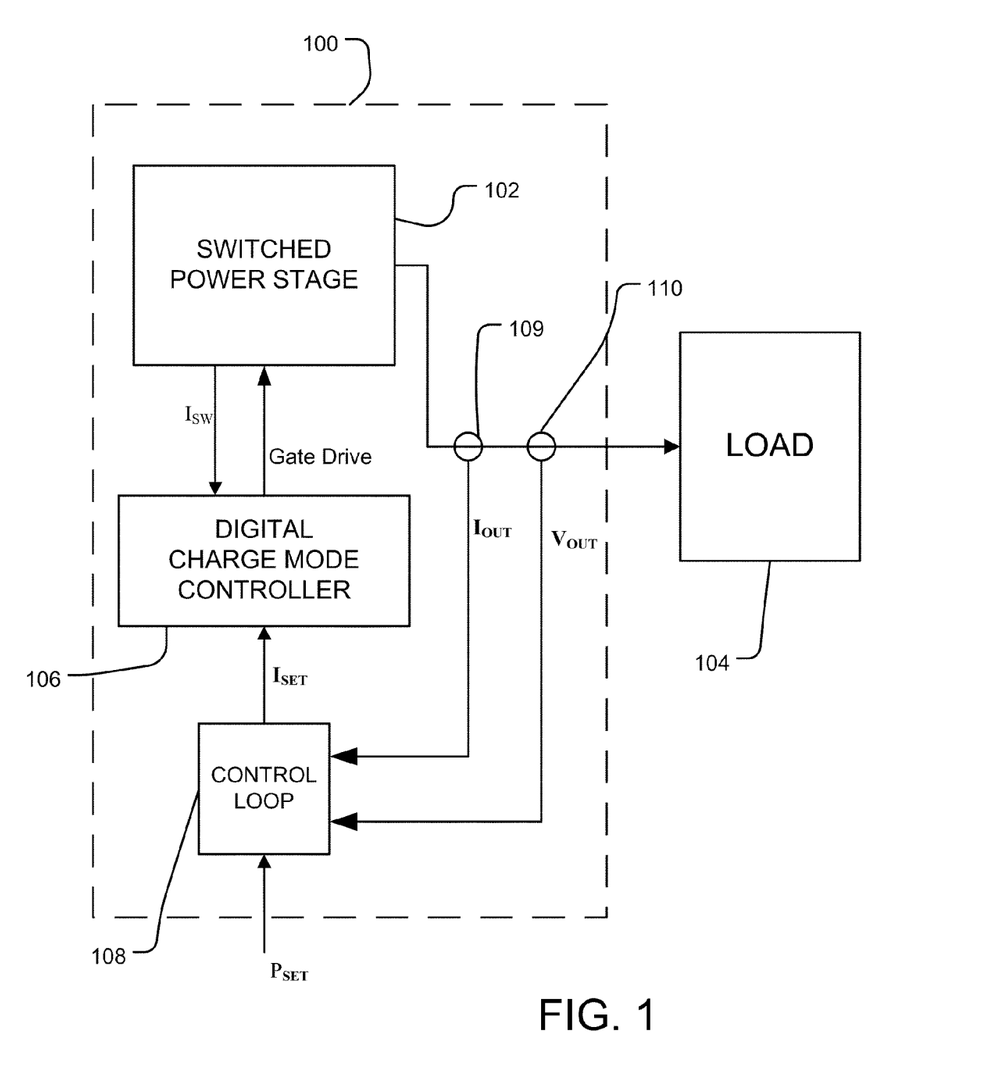
FIG. 1 shows one embodiment of the invention with a digital charge-mode controller for generating a gate drive signal for a switch in a switched power stage powering a load.

In the power supply system of FIG. 1 a power supply 100 incorporates one or more preferred embodiments of a digital charge-mode controller 106 of the present invention. The switched power stage 102 has a voltage converter and generates direct current (DC) voltage stepped down (buck converter) or stepped up (boost converter) respectively from the voltage provided by a DC power source. Digital charge-mode controller 106 in the preferred embodiment receives a current signal $I_{SW}$ as feedback from the switched power stage 102. The current signal $I_{SW}$ is a direct measure of current through a power switch in the power stage voltage converter. The digital charge-mode controller generates a gate drive signal to turn ON the power switch in the power stage.

Control loop 108 receives a power setting $P_{SET}$ selected by an operator as the desired power to be supplied to the load 104. The voltage $V_{OUT}$ and current $I_{OUT}$, which are output from the power stage 102 to the load 104, are sensed by sensors 109 and 110, respectively, and feedback as inputs to control loop 108. In this way the control loop 106 can monitor the actual power or energy being delivered to the load and generate a set current $I_{SET}$ for the digital charge-mode controller 106.

Digital charge-mode controller 106 integrates the switch current $I_{SW}$ to accumulate charge and compares the accumulated charge against a charge set point derived from the set current $I_{SET}$. In this way, the digital charge-mode controller controls the duty cycle D of the gate drive signal and thus the duty cycle D of one or more power switches in the power stage 102. The duty cycle D varies between 0.0 and 1.0 and represents the portion, or fraction, of the switching cycle that the gate drive signal is high and the power switch is ON or conducting. Thus, the duty cycle of the power switch controls power applied to the load 104. The power switch may be a MOSFET, power MOSFET, or IGBT to mention a few examples of electronic switches that could be used.

Figure 2:
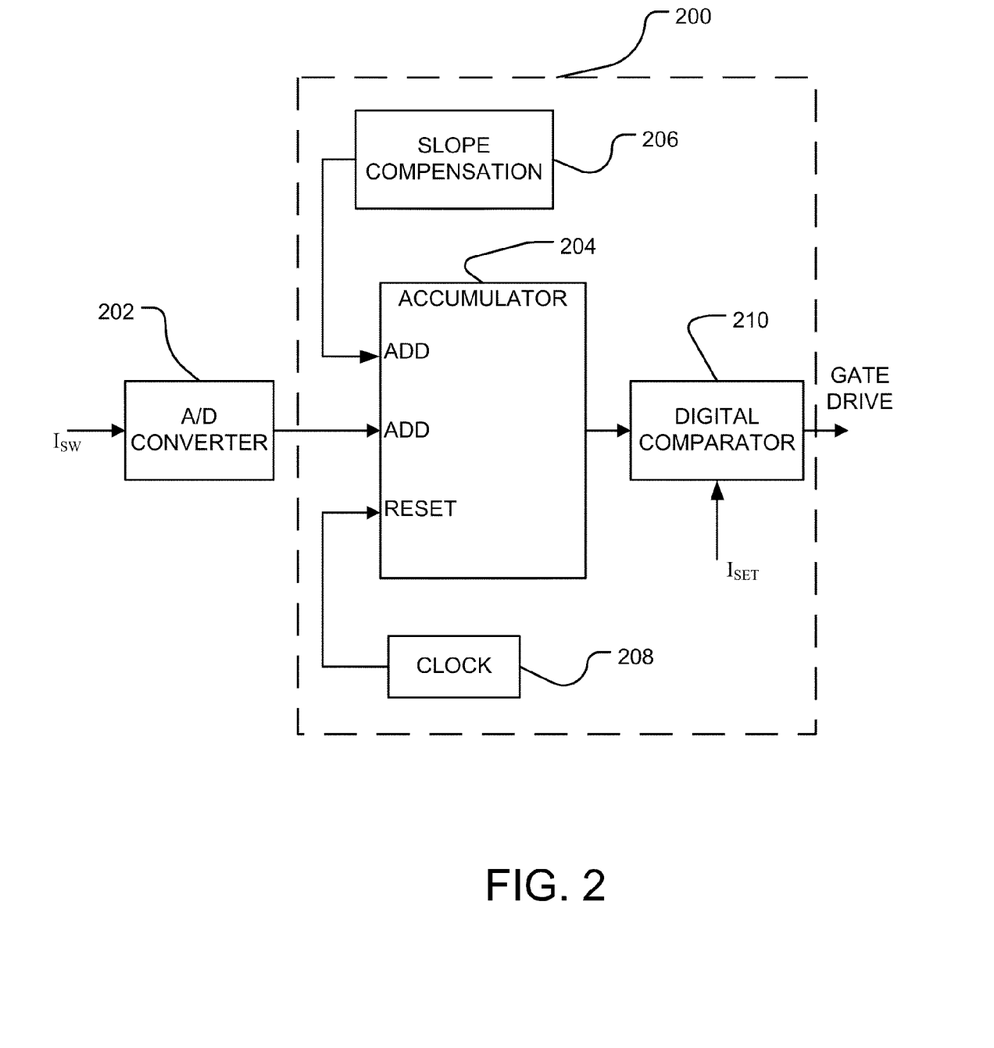
FIG. 2 shows a system diagram of one preferred embodiment of digital charge-mode controller 106 in FIG. 1.
Figure 3:
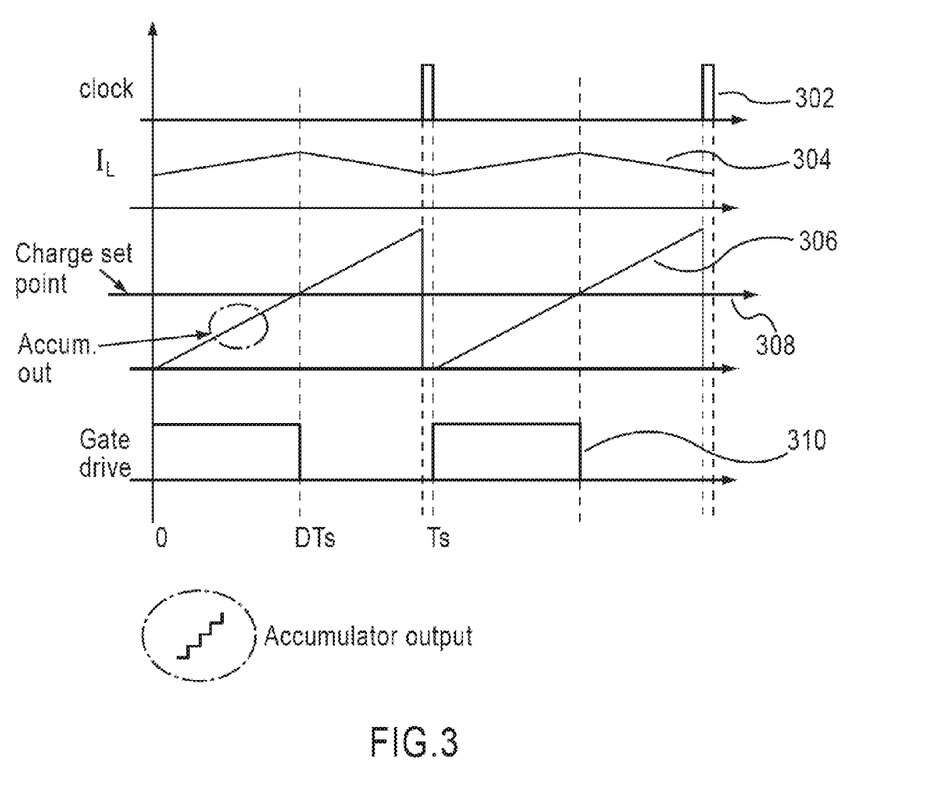
FIG. 3 illustrates signal waveforms occurring in a digital charge-mode controller.

FIG. 2 is a system diagram of a preferred embodiment of the digital charge-mode controller 106 of FIG. 1. FIG. 3 illustrates signals occurring in the digital charge-mode controller in FIG. 2. Analog-to-digital (A/D) converter 202 in FIG. 2 monitors the $I_{SW}$ signal and converts the signal to a digital value for input to the digital signal processing system 200. The digital signal processing system 200 may be a digital signal processor, a field programmable gate array, a general purpose microprocessor or any other programmable hardware device for processing digital values. The processing system is programmed to perform operations to provide a gate drive signal to one or more power switches in power stage 102 (FIG. 1).

Accumulator 204 receives the $I_{SW}$ current value from A/D converter 202 and a slope compensation value $S_C$ from slope compensation register 206. The $I_{SW}$ value and the slope compensation value $S_C$ are added together, and their sum is integrated over time in accumulator 204. Accumulator 204 advances the accumulated total at a sampling rate several hundred times faster than the switching frequency clock 208 shown as switching frequency clock pulses 302 in FIG. 3. Accumulator 204 is effectively integrating the sum of the $I_{SW}$ current value plus the slope compensation value $S_C$ to provide the accumulated charge waveform 306 which indicates a measure of charge being accumulated during one period $T_S$ of the switching frequency. Switching frequency clock 208 resets the accumulator 204 with switching frequency clock pulses 302. The trailing edge of the clock pulses 302 are the beginning of each switching cycle in the power stage 102 (FIG. 1).

The slope compensation value $S_C$ is added by the accumulator to prevent the controller and power stage from going unstable and oscillating. The power stage can become unstable because its voltage converter has an inductor with inductance L connected in series with the load and a capacitor with capacitance C connected in parallel with the load. Signal waveform 304 shows the inductor current $I_L$ through the inductor of the voltage converter. This LC circuit is the heart of the voltage converter in the power stage but it also makes power stage potentially very unstable. The Q factor (stability) of the power stage in general form is given by the expression:

$$Q=1/\{\pi[(1/R_E)-(D/2)]\}$$

Where:
D is the duty cycle.
$R_E$ is the normalized output load, and is given by the further expression:
$R_E$=Req/$LF_S$, and Req is equivalent resistance of the load, L is the inductance of the inductor in the voltage converter connected in series with the load, and $F_S$ is the switching frequency of the power switch.

From the above equation for Q, it can be seen that if $1/R_E>D/2$, then Q is positive and the power stage is stable.

Digital comparator 210 compares the accumulated charge value 306 from accumulator 204 with a charge set point 308. When the switching cycle begins at the trailing edge of clock pulse 302, comparator 210 raises the gate drive signal 310 to its high level. Comparator 210 receives the set current value $I_{SET}$ from control loop 108 (FIG. 1). Comparator 210 derives the charge set point 308 from the set current $I_{SET}$ value. When the accumulated charge value 306 reaches or exceeds the charge set point 308, the comparator drops the gate drive signal 310 to a low level. When the gate drive signal 310 drops to the low level, the power switch or switches in the power stage 102 (FIG. 1) open, and therefore $I_{SW}$ current through the switch drops to zero. A register (not shown) in accumulator 204 retains the most recent $I_{SW}$ current value when the switch was conducting until the switching cycle clock pulse 302 resets the accumulator at the beginning of the next switching cycle. The portion of the switching cycle, during which the gate drive signal 310 is high, corresponds to the duty cycle portion D of the switching cycle.

Figure 4:
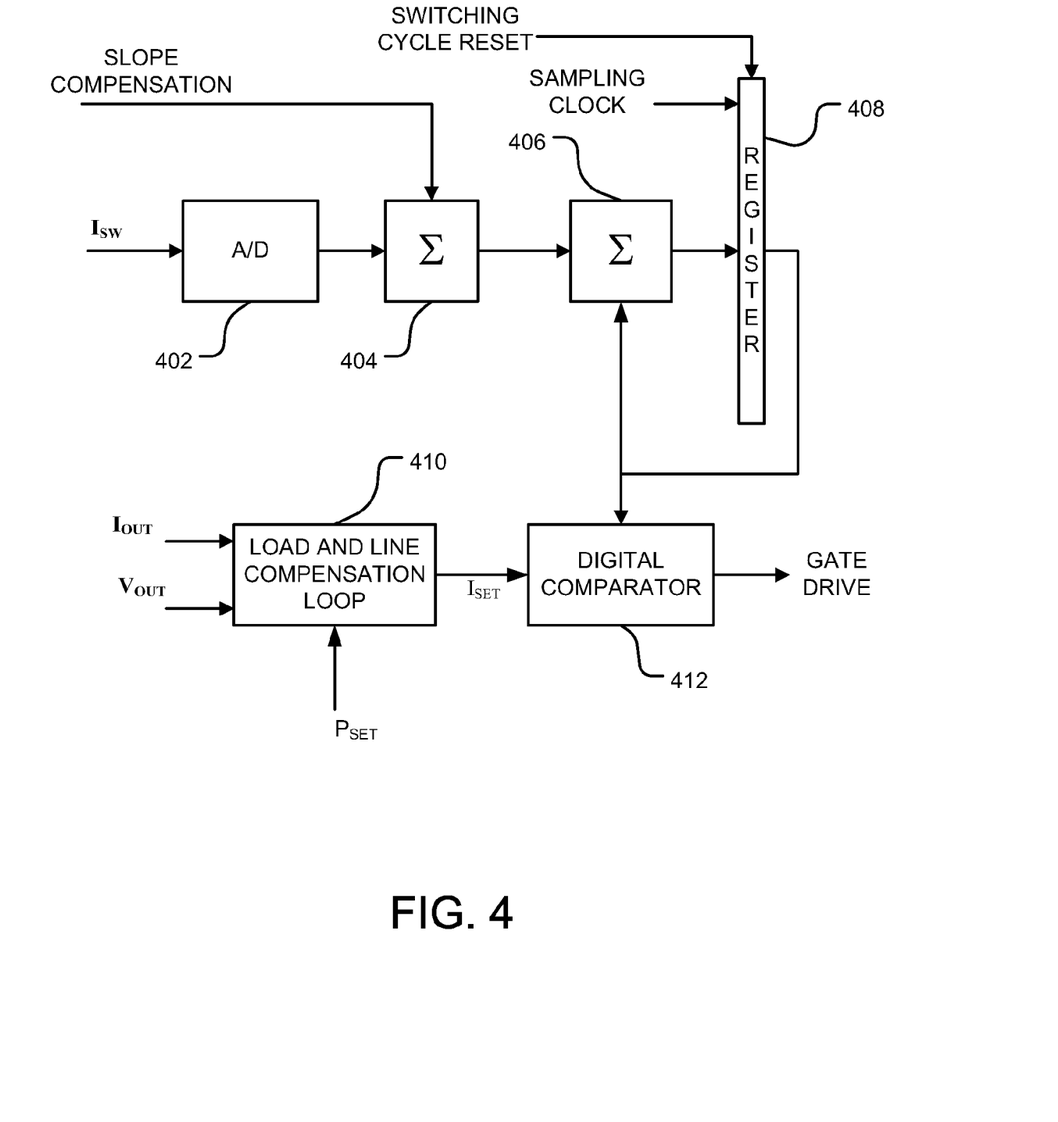
FIG. 4 shows a system diagram of another preferred embodiment of a digital charge-mode controller to provide the gate drive signal.

FIG. 4 shows another preferred embodiment of a digital charge mode controller 106 of FIG. 1 along with control loop 108 of FIG. 1. In FIG. 4 analog/digital (A/D) converter 402 receives the switch current $I_{SW}$, converts it to an $I_{SW}$ digital value and provides it to summing module 404. Summing module 404 also receives the slope compensation value $S_C$ and adds $S_C$ to $I_{SW}$ to provide their sum ($I_{SW}+S_C$) to summing module 406. Summing module 406 works with accumulator register 408 to integrate the slope-compensated switch current value ($I_{SW}+S_C$) during the switching cycle. The accumulated charge value in register 408 is feedback to summing module 406 to be added to the present slope-compensated switch current value. The new accumulated charge value is loaded in register 408 upon the occurrence of each sampling clock pulse, and is the integrated slope-compensated switch current value. The sampling clock rate is typically a few hundred times higher than the frequency of switching cycle clock pulse signal 302. Accordingly, the integrated slope-compensated switch current value in the accumulator register 408 is the accumulated charge waveform 306 in FIG. 3.

The accumulated charge value from register 408 is also provided to digital comparator 412. Digital comparator also receives the current set point $I_{SET}$ from the load and line compensation loop 410. Digital comparator 412 operates in the same manner as previously described for digital comparator 210 in FIG. 2. When the switching cycle begins, comparator 412 raises the gate drive signal 310 (FIG. 3) to its high level. From the set current $I_{SET}$ value digital comparator 412 derives the charge set point 308 which is compared by comparator 412 to the accumulated charge value, i.e. the integrated slope-compensated switch current. When the accumulated charge value 306 reaches or exceeds the charge set point 308, the comparator drops the gate drive signal 310 drops to a low level. The portion of the switching cycle during which the gate drive signal is high is the duty cycle portion D of the voltage converter of the switched power stage.

When the gate drive signal drops to the low level, the power switch opens and the current through the switch $I_{SW}$ in the switched power stage drops to zero. Accordingly, accumulated charge waveform 306 would rise thereafter only because of the $S_C$ value during the interval of time from $DT_S$ to $T_S$ in FIG. 3. To maintain the slope of waveform 306 as shown in FIG. 3 after time $DT_S$, A/D converter 402 could store the most recent $I_{SW}$ value received during the gate drive signal and be reset by the next switching cycle clock pulse 302. Alternatively, register 408 could have its sampling clock signal gated by the gate drive signal so that when the gate drive signal goes low, the sampling clock no longer updates the value in register 408. It does not matter what the accumulated charge value from register 408 does after time $DT_S$ so long as the digital comparator 612 continues to hold the gate drive signal low until the next switching cycle clock pulse. It will be appreciated that a design to ensure the integrity of the gate drive signal staying low after time $DT_S$ could be provided in any number of ways in addition to the two designs discussed in this paragraph.

Load and line compensation loop 410 is the outer control loop for the digital controller and controls the set current $I_{SET}$ and thus the charge set point 308. Load and line compensation loop monitors the power out of the switched power stage 102 (FIG. 1) by monitoring the voltage out $V_{OUT}$ and the current out $I_{OUT}$ from the power stage 102. As the load 104 (FIG. 1) changes or as losses occur in the load or the line to the load, the load and line compensation loop 408 compares the power out of the power stage to a preset power setting $P_{SET}$. Loop 408 then adjusts the set current $I_{SET}$. The change in set current changes the charge set point 308 and thus the duty cycle D of the power switch and the power out of the power stage.

Figure 5:
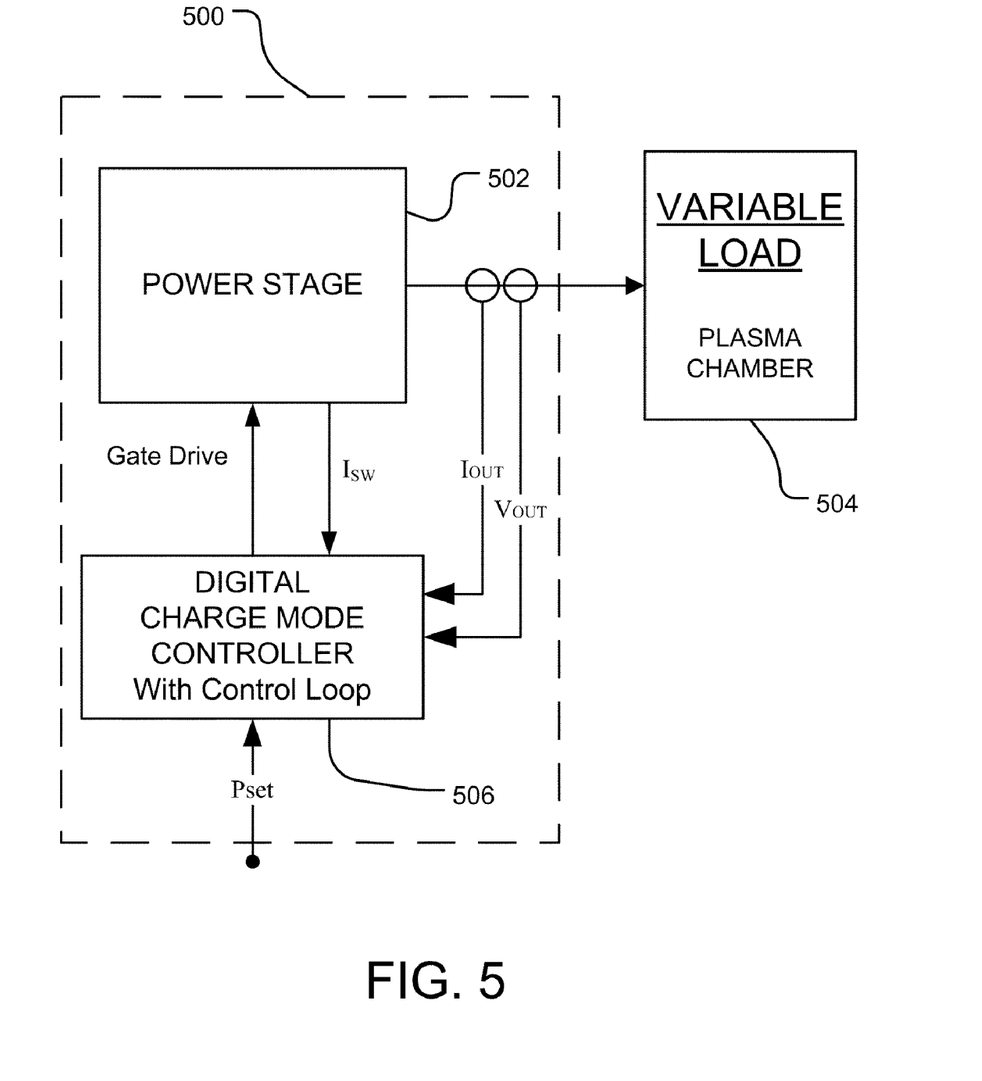
FIG. 5 shows another preferred embodiment of the invention where the switched power stage is driving a variable load and is controlled by a digital charge-mode controller with an integral control loop.

FIG. 5 shows another embodiment of the invention where the switched power stage is driving a variable load and is controlled by a digital charge-mode controller with an integral control loop. In the power supply system of FIG. 5 a power supply 500 incorporates another preferred embodiment of a digital charge-mode controller 506 of the present invention. The switched power stage 502 has a voltage converter (buck converter or a boost converter) and converts direct current (DC) voltage from a DC power source (not shown) to the voltage required by the variable load 504.

To be responsive to the variable load the digital charge-mode controller 506 must be responsive to variations in the load and able to rapidly adjust the duty cycle. One particular example of a variable load that is difficult to handle with a charge-mode controller is a plasma chamber. As will be discussed in more detail with reference to FIGS. 6 and 7, the slope compensation value used by the digital charge mode controller is dynamically adjusted to maintain stability despite variations in load and duty cycle.

Digital charge-mode controller 506 receives a current signal $I_{SW}$ as feedback from the switched power stage 502. The current signal $I_{SW}$ is a direct measure of current through the switch in the power stage while the switch is ON or conducting. It is also worth noting that in all the preferred embodiments there is a close relationship between $I_{OUT}$ and $I_{SW}$. Therefore, another embodiment of the digital charge-mode controller might derive an $I_{SW}$ value from $I_{OUT}$.

The control loop in the digital charge-mode controller 506 receives a power setting $P_{SET}$ selected by an operator as the desired power to be applied to the variable load 504. The voltage $V_{OUT}$ and current $I_{OUT}$, which are output from the power stage 502 to the variable load 504, are sensed by sensors 509 and 510, respectively. They are feedback as inputs to the control loop within the controller 506. In this way the control loop can monitor the actual power or energy being delivered to the load and feedback a set current $I_{SET}$ to the digital charge-mode controller 506. Controller 506 integrates the current $I_{SW}$ and compares the accumulated charge against a charge set point derived from the set current $I_{SET}$. The digital charge-mode controller controls the duty cycle D of gate drive signal and thus the duty cycle D of one or more switches in the voltage converter of power stage 502.

Figure 6:
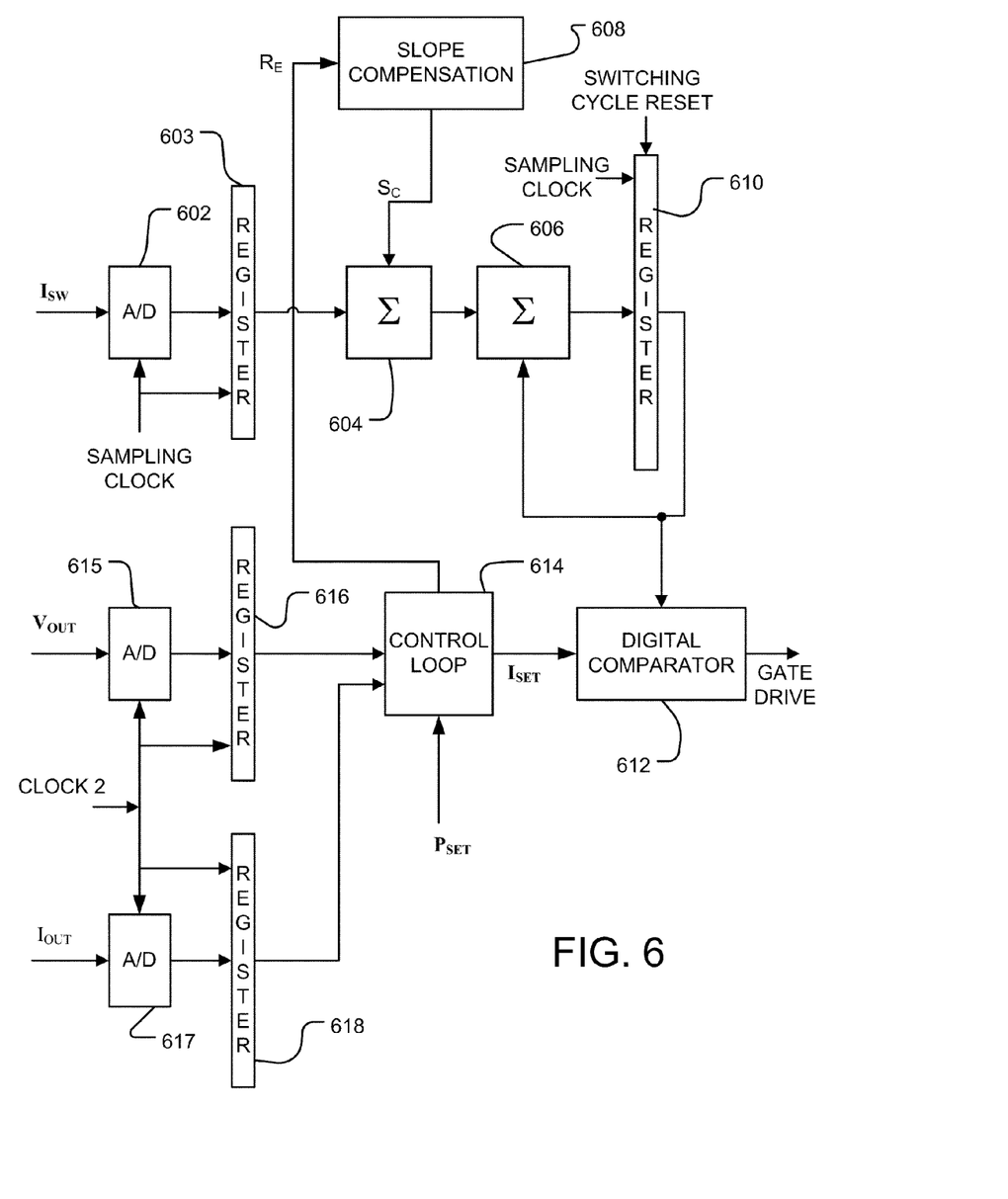
FIG. 6 is a system diagram of modules making up the digital charge-mode controller 506 of FIG. 5.

FIG. 6 is a system diagram of modules making up digital charge-mode controller 506 of FIG. 5. In FIG. 6 A/D (analog/digital) converter 602 monitors the switch current $I_{SW}$, converts it to an $I_{SW}$ digital value for loading into $I_{SW}$ register 603 during each sampling interval. The sampling frequency is much higher than the switching frequency of the power switch so that the sampling interval is a small part of the switching cycle.

Summing module 604 receives the $I_{SW}$ value from $I_{SW}$ register 603 during each sampling interval. Summing module 604 also receives the slope compensation value $S_C$ from slope compensation module 608 and adds the slope compensation value $S_C$ to the switch current value $I_{SW}$ to provide the sum ($I_{SW}+S_C$) to summing module 606. Summing module 606 works with accumulated charge register 610 to integrate the slope compensated, switch current value, $I_{SW}+S_C$, during the switching cycle. The accumulated charge value in register 610 is feedback to summing module 606 to be added to the slope compensated, switch current value, and a new accumulated charge value is loaded into accumulating register 610 during each sampling interval. Normally, the output of register 610 is the accumulated charge waveform 306 in FIG. 3. However in this embodiment with a variable load, the switch current $I_{SW}$ may now be changing for each sampling interval, and the accumulated charge waveform 306 may be rising at a non-linear rate.

The accumulated charge value from accumulating register 610 is sent to digital comparator 612. Digital comparator 612 also receives the current set point value $I_{SET}$ from the control loop 614. When the switching cycle begins, comparator 612 raises the gate drive signal 310 (FIG. 3) to its high level. From the $I_{SET}$ value digital comparator 612 derives the charge set point value 308 (FIG. 3) which is compared by comparator 612 to the accumulated charge value, i.e. the integrated slope compensated, switch current. When the accumulated charge value 306 reaches or exceeds the charge set point 308, the comparator drops the gate drive signal 310 to a low level. The portion of the switching cycle, during which the gate drive signal is high, corresponds to the duty cycle portion D of the voltage converter during its switching cycle.

Control loop 614 controls the set current $I_{SET}$ and thus the charge set point 308. Control loop 614 receives the voltage out value $V_{OUT}$ from register 616 and the current out value $I_{OUT}$ from register 618. $V_{OUT}$ and $I_{OUT}$ are converted to digital values by A/D (analog/digital) converters 615 and 617 respectively. The clock 2 signal gates each A/D converter and its paired register to update the voltage out value $V_{OUT}$ and the current out value $I_{OUT}$ at a rate required by the control loop. This frequency of the "clock 2" signal is chosen as a function of the rate of variation expected in the variable load. In other words the sampling rate of the "clock 2" signal for gating registers 616 and 618 to feed data to the control loop is selected to provide sufficient control of the power delivered to the variable load 504.

In operation, the control loop module 614 monitors the power out of the switched power stage 502 (FIG. 5) by multiplying the voltage out $V_{OUT}$ by the current out $I_{OUT}$. As the variable load 504 (FIG. 5) changes or losses occur in the load, the control loop 614 compares the power out ($V_{OUT} \times I_{OUT}$) of the power stage to a preset power setting $P_{SET}$. Loop 614 then adjusts the set current $I_{SET}$. The change in set current changes the charge set point 308 and thus the duty cycle D and the power out of the power stage. At the same time the control loop 614 derives the normalized output load $R_E$ from $V_{OUT}$ and $I_{OUT}$ and provides $R_E$ to the slope compensation module 608.

Figure 7:
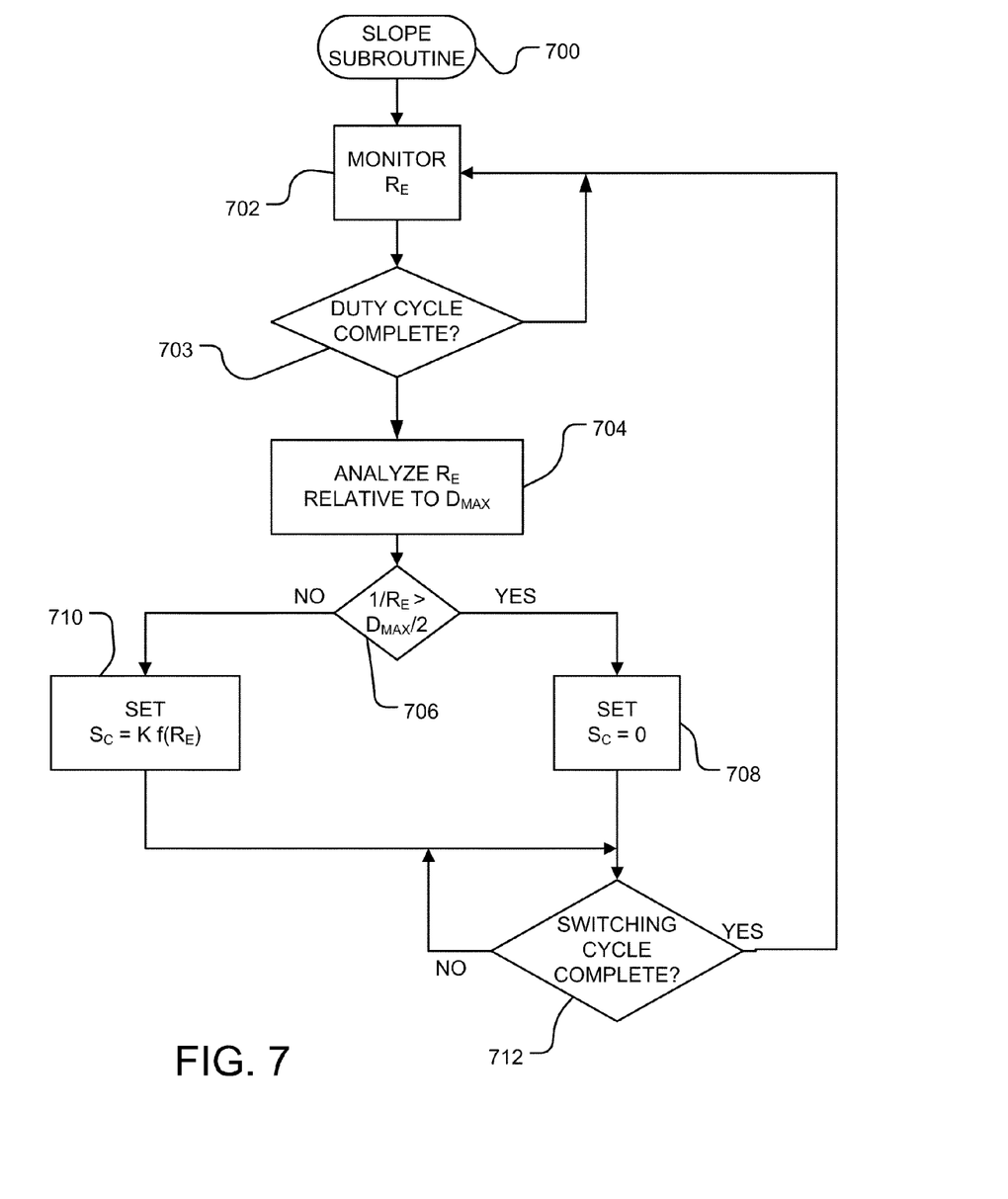
FIG. 7 shows the operational flow for the slope compensation module 608 of FIG. 6.

In FIGS. 6 and 7, the slope compensation value $S_C$ is updated during the previous switching cycle after the duty cycle D is complete i.e. after time $DT_S$ (FIG. 3). The operations performed by the slope compensation module to update the slope compensation value $S_C$ are described hereinafter with reference to FIG. 7. Thus, the accumulated charge value is dynamically adjusted for $I_{SW}$ changes each sampling interval and for slope compensation value $S_C$ each switching cycle. As described earlier the sampling clock frequency is much higher than the switching cycle frequency.

FIG. 7 shows the operational flow for the slope compensation module 608 of FIG. 6. The operational flow begins when the slope subroutine is called and the subroutine is entered at operation 700. Monitor operation 702 monitors the load impedance of the variable load. The load impedance being monitored in FIG. 7 is the normalized output load value $R_E$ of the load derived by control loop 614.

Duty-cycle-complete test operation 703 detects when the duty cycle is complete, i.e. the time $DT_S$ (FIG. 3) has been reached in the switching cycle. Until the duty cycle is complete, the operation flow branches NO from test operation 703 and returns to monitor operation 702. After time $DT_S$, the operation flow branches YES to analyze operation 704, and the slope compensation value $S_C$ will be set for the next switching cycle.

The setting of $S_C$ begins at analyze operation 704. Analyze operation 704 compares the normalized output load value $R_E$ to the duty cycle maximum value $D_{MAX}$. $D_{MAX}$ value is set when the switched power stage is designed. The $D_{MAX}$ value would be set slightly below 1.0; typical values $D_{MAX}$ might fall between 0.75 and 0.90. Stability test operation 706 receives $1/R_E$ and $D_{MAX}/2$ from analysis operation 704 and compares $1/R_E$ to $D_{MAX}/2$. If $1/R_E > D_{MAX}/2$, then the operation flow branches YES to set zero slope operation 708 where the slope compensation value $S_C$ is set to zero. In this situation the load and duty cycle values are such that the digital charge-mode controller and voltage converter are stable and no slope compensation value is necessary.

If $1/R_E$ is less than or equal to DMAX/2, then the operation flow branches NO to set slope compensation operation 710. In this situation a slope compensation value $S_C$ is required in order to ensure stability of the digital charge-mode controller and voltage converter. The slope compensation value is set to a stabilizing value which is a function of the normalized output load value $R_E$ multiplied by the constant K. For a plasma chamber load and a preset maximum for the duty cycle, the slope compensation value $S_C$ is set to a stabilizing value given by the following equation:

$$S_C = K\{V_{OUT}[(D_{MAX}/2LF_S)-(1/R_E)]\}$$

Where:
K is a constant to ensure $S_C$ is large enough to achieve stability;
$F_S$ is the switching frequency, i.e. frequency of clock pulses 302 (FIG. 3);
L is the inductance of the inductor in the voltage converter; and
$R_E$ is the normalized output load value.

The optimum controller performance setting for $S_C$ is a value calculated from the above $S_C$ expression with constant K=1. However, this would put the controller and voltage converter of the power stage on the edge of going from stable to unstable and oscillating. Therefore, K is set a fraction greater than 1.0 as for example between 1.10 and 1.20 to ensure that the digital charge-mode controller operates near optimum responsiveness but also remains stable. In this way, the slope subroutine sets the slope compensation value for the next switching cycle after the duty cycle D is complete (after time $DT_S$) in the present switching cycle.

After the slope compensation value is set, the operation flow advances to switching cycle complete test operation 712. So long as the switching cycle is not complete, the operation flow loops in the NO loop waiting for the switching cycle to finish. When the switching cycle completes, the operation flow branches YES from test operation 712 to monitor operation 702. The next switching cycle begins, and the slope subroutine repeats as described above.

In conclusion, the present invention provides, among other things, a system and method for stable charge-mode control of a switched power stage that has a voltage converter. The voltage converter might be stepping down voltages to supply power over a wide range of applications from a high voltage plasma chamber to a low voltage personal computer. Similarly, the voltage converter might be stepping up voltages to supply power over a wide range of applications from low voltage integrated circuits in hand held devices to high voltage motors in hybrid automobiles.

Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A digital charge-mode controller for a switched power stage powering a load, the switched power stage having a converter with a duty cycle switch driven by a gate drive signal with a switching cycle having a duty cycle portion for controlling the power supplied by the power stage to the load, said controller comprising:
    an analog/digital converter configured to convert the current through the duty cycle switch to a switch current value;
    an accumulator module configured to add a slope compensation value to the switch current value, and to integrate the slope-compensated switch current value during the switching cycle and output an accumulated charge value; and
    a comparator module configured, responsive to the accumulated charge value and a charge set point, to generate the gate drive signal for the duty cycle switch that turns the duty cycle switch ON when the accumulated charge value is less than the charge set point and turns the duty cycle switch OFF when the accumulated charge value reaches the charge set point and thereby controls the duty cycle of the converter and the power supplied by the power stage.

2. The controller of claim 1 wherein the load is a variable load and the controller comprises:
    a control loop responsive to the power out of the power stage and a power setting, said control loop generating a current set value to adjust the power to the variable load as the load changes.

3. The controller of claim 2 wherein the variable load is a plasma chamber.

4. The controller of claim 1 wherein said accumulator module further comprises:
    a first summing module configured to add the slope compensation value to the switch current value so as to provide the slope-compensated switch current value; and
    a second summing module configured to add the slope-compensated switch current value to the accumulated charge value so as to integrate the slope-compensated switch current value during the switching cycle.

5. The controller of claim 4 wherein:
    said comparator module is configured to raise the level of the gate drive signal to a high level to turn the duty cycle switch ON when the accumulated charge value is below the charge set point; and
    said comparator module is configured to drop the level of the gate drive signal to a low level to turn the duty cycle switch OFF when the accumulated charge value reaches or exceeds the charge set point.

6. The controller of claim 5 wherein the load is a plasma chamber and the controller further comprises:
    a control loop configured, responsive to the power out of the power stage and a power setting, to generate a current set value to adjust the power to the plasma chamber as its load changes.

7. In a power supply having a switched power stage driving a load, a digital charge mode controller controlling a duty cycle portion of a switching cycle for a power switch in the switched power stage and thereby the power supplied to the load, the digital charge mode controller comprising:
    an analog/digital converter configured to monitor a current through the power switch and convert the current to a switch current value at a sampling rate shorter than a period of the switching cycle so that a sampling interval for the switch current value is small compared to the period of the switching cycle;

a summing module configured to sum, during each sampling interval, a slope compensation value with the switch current value to provide a slope-compensated switch current value for each sample of the switch current value;

an integrating module configured to integrate, during each sampling interval, a present slope-compensated switch current value with previously integrated slope-compensated switch current values and output an accumulated charge value after each sample interval; and a comparator module configured, responsive to the accumulated charge value and a charge set point, to generate a gate drive signal for the power switch that turns the power switch ON at the beginning of the switching cycle and turns the power switch OFF when the accumulated charge value reaches the charge set point and thereby control the duty cycle of the power switch and the power supplied by the power stage.

8. In the power supply of claim 7, the controller further comprises:

a slope compensation module configured, responsive to a load impedance value, to generate the slope-compensation value.

9. In the power supply of claim 8, wherein the load is a variable load and the controller further comprises:

a control loop configured to generate the load impedance value for the slope compensation module responsive to the current out of the power stage.

10. In the power supply of claim 9, wherein:

said slope compensation module of the controller is configured to receive the load impedance value from the control loop and set the slope compensation value for the next switching cycle while the power switch is OFF during the present switching cycle.

11. In the power supply of claim 10, wherein:

said control loop of the controller also responds to a preset power setting for the variable load and generates a set current value to adjust the power to the variable load as the load changes.

12. In the power supply of claim 11, wherein the variable load is a plasma chamber and the load impedance value is a normalized resistance value.

13. In the power supply of claim 8 wherein said integrating module of the controller further comprises:

an accumulating register configured to store the accumulated charge value; and a summing module configured to add the slope-compensated switch current value to the accumulated charge value from said accumulating register during each sampling interval whereby the slope-compensated switch current value is integrated to provide the accumulated charge value.

14. In the power supply of claim 8 wherein said slope compensation module of the controller further comprises:

an analysis module to analyze the load value relative to a maximum value for the duty cycle of the gate drive signal;

a first setting module responsive to the analysis module and configured to set the slope compensation value to zero if the load value relative to the maximum value of the duty cycle is such that the controller is stable; and a second setting module responsive to the analysis module and setting the slope compensation value to a stabilizing value above zero if the load value relative to the maximum value of the duty cycle is such that the controller would oscillate if the slope compensation value was not added to the switch current value.

15. A method for stabilizing a digital charge-mode controller and a switched power stage in a power supply to supply power to a load having a variable load impedance, the power stage being a converter having a power switch with a duty cycle whereby the digital charge mode controller operating with the power stage may go unstable and oscillate, and the digital charge mode controller integrating a switch current value from the power switch to accumulate a charge value to control the duty cycle of the power switch, said method for stabilizing the digital charge mode controller and a switched power stage comprising the acts of:

adding a slope compensation value to the switch current value before the switch current value is integrated so that a slope-compensated switch current value is integrated to control the duty cycle;

monitoring the variable load impedance of the load and generating a load impedance value;

analyzing the load impedance value relative to a maximum value for the duty cycle of the power switch;

first setting the slope compensation value to zero if the load impedance value relative to the maximum value of the duty cycle is such that the controller will not oscillate; and second setting the slope compensation value to a stabilizing value, if the load impedance value relative to the maximum value of the duty cycle is such that the controller may oscillate, the stabilizing value being large enough to ensure that the controller and switched power stage will not oscillate.

16. The method of claim 15 wherein the load impedance value is a normalized output load value for the variable load.

17. The method of claim 16 wherein said acts of analyzing, first setting and second setting further comprise:

said analyzing act detecting whether an inverted normalized output load value is greater than one half of the maximum value of the duty cycle;

said first setting act being responsive to the inverted normalized output load value being greater than one half of the maximum value of the duty cycle to set the slope compensation value to zero; and said second setting act being responsive to the inverted normalized output load value being equal to or less than one half of the maximum value of the duty cycle to set the slope compensation value to the stabilizing value.

18. The method of claim 17 wherein the stabilizing value for the slope compensation value is a function of the normalized output load value of the variable load.

19. The method of claim 15 where the variable load is a plasma chamber.

* * * * *